(12) United States Patent
Simard et al.

(10) Patent No.: US 7,623,710 B2
(45) Date of Patent: Nov. 24, 2009

(54) DOCUMENT CONTENT AND STRUCTURE CONVERSION

(75) Inventors: Patrice Y. Simard, Bellevue, WA (US); Radoslav Petrov Nickolov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 11/353,915

(22) Filed: Feb. 14, 2006

(65) Prior Publication Data

US 2007/0192687 A1    Aug. 16, 2007

(51) Int. Cl.
*G06K 9/34* (2006.01)
(52) U.S. Cl. .................................................. 382/175
(58) Field of Classification Search ................ 382/173, 382/175–180, 226–231, 305–306; 358/403, 358/537–538
See application file for complete search history.

(56) References Cited

U.S. PATENT DOCUMENTS 5,586,196 A * 12/1996 Sussman ..................... 382/114
6,678,415 B1 * 1/2004 Popat et al. ................. 382/226
6,687,404 B1 * 2/2004 Hull et al. .................... 382/226

OTHER PUBLICATIONS

Manuel J. Fonseca, et al., Retrieving ClipArt Images by Content, International Conference on Image and Video Retrieval (CIVR'04), Jul. 2004, Dublin, Ireland; 9 pages.
E.G. M. Petrakis, et al., Similarity Searching In Large Image Databases, 1995, Technical Report 3388, Department of Computer Science, University of Maryland; 33 pages.
B. Kaliski, RFC 1319—The MD2 Message-Digest Algorithm, Apr. 1992, RSA Data Security, Inc.; 17 pages.
R. Rivest, RFC 1320—The MD4 Message-Digest Algorithm, Apr. 1992, MIT Laboratory for Computer Science and RSA Data Security, Inc.; 20 pages.
R. Rivest, RFC 1321—The MD5 Message-Digest Algorithm, Apr. 1992, MIT Laboratory for Computer Science and RSA Data Security, Inc.; 21 pages.
Benjamin B. Kimia, Shape Representation for Image Retrieval, at Chapter 13 of Image Databases : Search and Retrieval Of Digital Imagery, Editor(s): Vittorio Castelli, Lawrence D. Bergman, Apr. 2002, John Wiley & Sons; 32 pages.
D. Eastlake, 3rd, et al., RFC 3174—US Secure Hash Algorithm 1 (SHA1), Sep. 2001, Motorola (Eastlake) and Cisco Systems (Jones); 22 pages.

* cited by examiner

*Primary Examiner*—Jose L Couso
(74) *Attorney, Agent, or Firm*—Lee & Hayes, PLLC

(57) ABSTRACT

A system that can convert content and structure of a document from an original format into a target format irrespective of the functional specifics of the original format. The system can automatically infer the content and structure of a document via a rendered format thereby restoring the programmatic functionality of the original file (or generating programmatic functionality of a desired target format) through the novel conversion/import process. The system can extract the document structure (e.g., layout) together with the content in order to effectuate the conversion. Heuristics (e.g., logic and/or reasoning) can be employed to make decisions with respect to importing the document into a target format and/or formats.

20 Claims, 11 Drawing Sheets

DOCUMENT CONTENT AND STRUCTURE CONVERSION

BACKGROUND

Conventionally, optical character recognition (OCR) has been used to convert the content of a document from one format to another. Generally, OCR refers to a mechanism of machine recognition of printed alphanumeric characters. Although OCR systems can recognize many different fonts, as well as typewriter and computer-printed characters, they are often limited to certain fonts. Advanced OCR systems are being developed that can recognize hand printing. Unfortunately, OCR systems today only provide limited capabilities to detect functional characteristics of structure (e.g., layout) of a document thereby leaving the user with a sometimes overwhelming task of reformatting the document in order to replicate the original document.

In a typical scanning operation, a bitmap is created by electronically scanning a text document. The bitmap is a binary representation in which a bit or set of bits can correspond to some part of an object such as an image or font. By way of example, in monochrome systems, one bit represents one pixel on screen. For gray scale or color, several bits in the bitmap represent one pixel or group of pixels. Although a bitmap is most often associated with graphics objects, in which the bits are a direct representation of the picture image, bitmaps can be used to represent any portion of a document. In doing so, each bit location is assigned a different value or condition.

When a text document is scanned into a computer, it is turned into a bitmap, which, as described above, can represent an image of the text. Subsequently, the OCR software can analyze the light and dark areas of the bitmap in order to identify each alphabetic letter and numeric digit. When the OCR system recognizes a character, it converts it into ASCII text.

Although extremely limited, conventional OCR systems are oftentimes used in converting standard formats, such as portable document format (PDF), into text. This task is very difficult because all the structure of the document is lost when the document is rendered for the purpose of OCR. That structure must therefore be inferred or recovered reliably if the document is to be repurposed. A more standard approach is to write a converter that is knowledgeable of the original format and does the conversion by "parsing" or interpreting the commands in the original format. The problem with doing this is that universality is lost: the conversion then depends on the specifics of the format which are subject to change and are different with every format.

As stated above, although OCR has been employed in the past to parse and convert text into a target format, these systems do not consider the originating and/or target formats for the documents. Additionally, conventional systems parse the format of the original document (e.g., PDF). As such, it is imperative that the system is knowledgeable of the source format and must continually maintain compatibility with any changes therein.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can convert content and structure of a document from an original format into a target format. The novel innovation can automatically infer the content and structure of a document via a rendered format thereby restoring the programmatic functionality of the original file through the conversion/import process. In a disparate aspect, whether a single or multiple target format is employed with respect to the conversion, it is to be understood and appreciated that in accordance with the conversion, portions of the document can be included in the target format as a bitmap in the event that the target format does not support the particular content and/or structure.

The innovation can extract the document structure together with the content in order to effectuate the conversion. In a particular aspect of the innovation, a document having two columns can be converted to a word processing format thereby converting and enabling the column format together with the textual format. In other words, the text flow (e.g., columns) can be recognized or inferred and converted into the target word processing format.

It is to be appreciated that any characteristic (e.g., content or structure) that is included in a visual representation can be recovered and converted into a target format(s). The innovation can employ heuristics to infer authoring information related to an original format. In accordance with the novel aspects of the innovation, the content (e.g., text, pictures) together with the structure (e.g., format, spacing) can be recovered, interpreted and converted into the target format(s).

A particular novel feature of the innovation described herein is the import feature based upon rendering a third party document in its visual form. In other words, the innovation can be based upon analyzing the visual (or rendered) form of a document and performing a conversion into a target format or group of target formats accordingly. More particularly, the import feature of the subject innovation can parse the visual or otherwise rendered form of a document in an original format thereafter inferring the structure that a target format understands (e.g., text, formulas, tables). Thereafter, it is a novel feature of the innovation to import the information (e.g., content, structure) and convert it accordingly.

All in all, the subject innovation can infer the logical structure (e.g., layout) of a document based upon a visual appearance or rendered form. As described above, heuristics (e.g., logic and/or reasoning) can be employed to make decisions with respect to importing the document into a target format and/or formats. In other aspects, the innovation can employ an inquiry component that can query a user with respect to a particular import preference. For example, the system can query the user to determine how to insert the information, for example, "should the portion be text with tabs, a table or a bitmap?" In one example, the query can be employed when issues are ambiguous or when errors are encountered. In these cases, user interaction can be employed. However, it is a further novel feature of the innovation to make determinations automatically via heuristics.

In yet another aspect thereof, a machine learning component is provided that employs a probabilistic and/or statistical-based analysis to infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
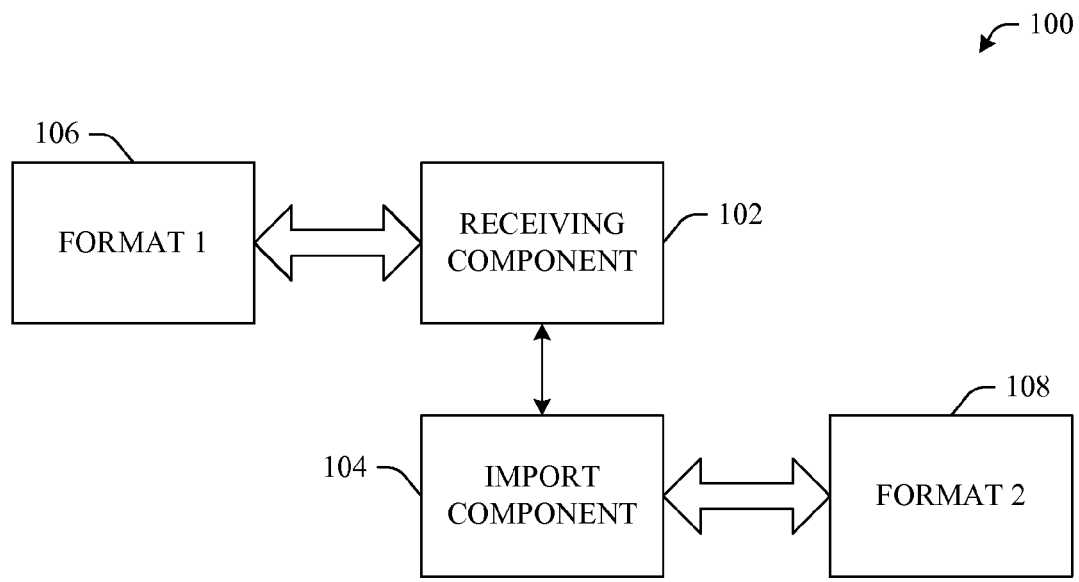
FIG. 1 illustrates a system that converts a document from a source format into a target format in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system " are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates converting and importing an electronic document between formats. Generally, system 100 can include a receiving component 102 and an import component 104, each of which contributes to the translation from a first format 106 to a second format 108. Although FIG. 1 illustrates a conversion between two disparate formats (106, 108), it is to be understood that the novel concepts of the innovation can be employed to convert many formats to one format as well as one format to many formats.

In order to more easily describe the innovation and functionality associated therewith, the innovation is described with reference to specific known formats. It is to be appreciated that, although novel, these scenarios are included to provide context to the innovation and are not intended to limit the innovation in any way. In other words, the innovation can be employed as a conversion mechanism between any known formats. These additional scenarios are to be included within the scope of the disclosure as well as the claims appended hereto.

With reference to a specific document format (e.g., PDF, LotusNotes, WordPerfect, etc.) conversion, as described supra, conventional systems parse the document by accessing the file format of the document and parsing the structure of how to display the document based upon the particular file format. Accordingly, the document can be displayed by extracting data from the parsing and thereafter the data can be synthesized to arrive with the target format. It is important to note that the conventional systems require knowledge of the intricacies related to the original format (e.g., PDF, LotusNotes, WordPerfect, etc.). For at least this reason, conventional systems are bound to the source format. Accordingly, any change in the source format can render a conventional system inoperable.

Irrespective of the source format, the subject innovation, via the import component 104 can employ a visual representation of the document to effect the translation from a first format 106 to a second format 108. In one particular aspect, the subject innovation can employ a printer driver that generates pixels to be printed thereafter converting the image to a target format. For example, in the case of a PDF document, the viewing application Acrobat can be used to generate the printing information. Essentially, the subject invention can employ any application that can read the format (e.g., print driver) of a first format 106 to convert it to a target format 108.

In operation, an application (e.g., print driver) can render a visual representation of a document in a first format 106. This visual representation can be transmitted to the receiving component 102 and thereafter translated via the import component 104 into a target format 108. In one particular example, the import component 104 can employ a raster representation of the rendered document in order to effect the conversion into the target format 108.

Figure 2:
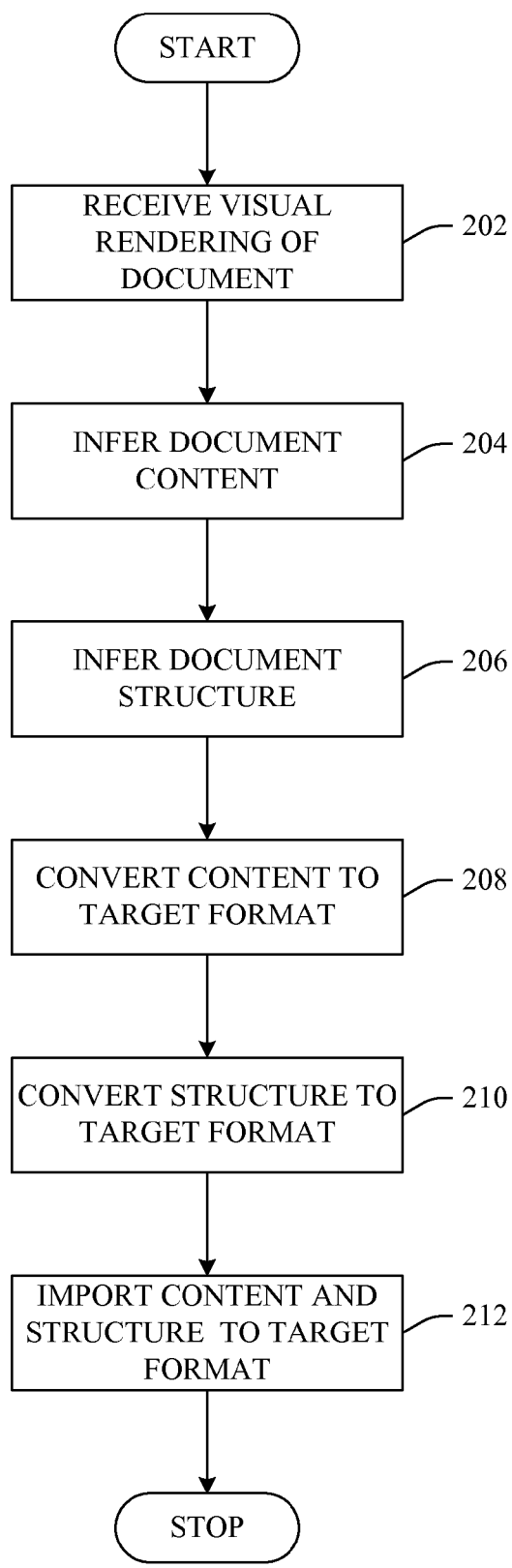
FIG. 2 illustrates an exemplary flow chart of procedures that facilitate generating a functional target format document in accordance with an aspect of the innovation.

FIG. 2 illustrates a methodology of converting and importing a document from first format into a target format in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a visual rendering of a document in a first format is received. By way of example, a print driver or other capable application can be employed to generate the visual rendering of the document. The content of the document can be inferred at 204. In other words, alphanumeric characters, tables, images, etc., can be inferred from the visual rendering of the document. Similarly, at 206, structure of the document can be inferred in order to supplement the conversion and subsequent import of the document into a target format.

Once inferred, the content and structure can be converted at 208 and 210 respectively. In doing so, in one aspect, heuristics can be employed to determine capability and/or compatibility of the target format with respect to the document. By way of example, suppose the document contains an unsupported table structure, in this scenario, the subject innovation can convert the table into a bit-map thereafter importing the table as a generic image rather than a recognized table format. It is to be understood and appreciated that it is a novel aspect of the innovation to effectuate conversion of both content and structure such that the resultant document maintains (obtains or regains) specialized functionality of the original document.

At 212, the content and structure can be imported into the target format. As described above, it is a novel feature of the subject innovation to maintain format-specific functionality within the converted (or imported) document. By way of example, consider a scenario where a document is created in word processor A, and is subsequently converted to another format (e.g., PDF). The novel conversion and import functionality of the subject innovation can be employed to recreate the original document in its original format.

In another scenario, suppose a document is created with word processor A, one problem is that word processor A embedded information that may be confidential but is invisible when printed: e.g., comments, white text on white background, occluded text, etc. The document can be sent to a printed driver, or rendered, and then reconverted to original format using the subject innovation. In the process, all invisible information embedded in the original format can be guaranteed to be removed.

In accordance with still another scenario, suppose a document is created with word processor A, here, word processor A may soon become obsolete, or will no longer be supported by the company. Thus, no conversion tool would be available to convert document from word processor A to new company format. The subject innovation provides a means to do the conversion automatically by merely printing the document. In doing so, as described in accordance with the methodology of FIG. 2, the innovation can employ a visually rendered format of the document to effectuate inferring content and structure consistent with the target format. Continuing with the example, upon importing the original format document into word processor A format, the innovation can infer the content and structure thereafter recreating the necessary information to generate the original document. As an example, although a table would merely appear as a bit-map in the original format format, the innovation can recognize the table, infer its structure, and subsequently import it into the target (or in this case, original) format. Thus, the table will again be recognized as a table in the target format (e.g., word processor A) whereby manipulation and/or revision can be employed as desired.

Figure 3:
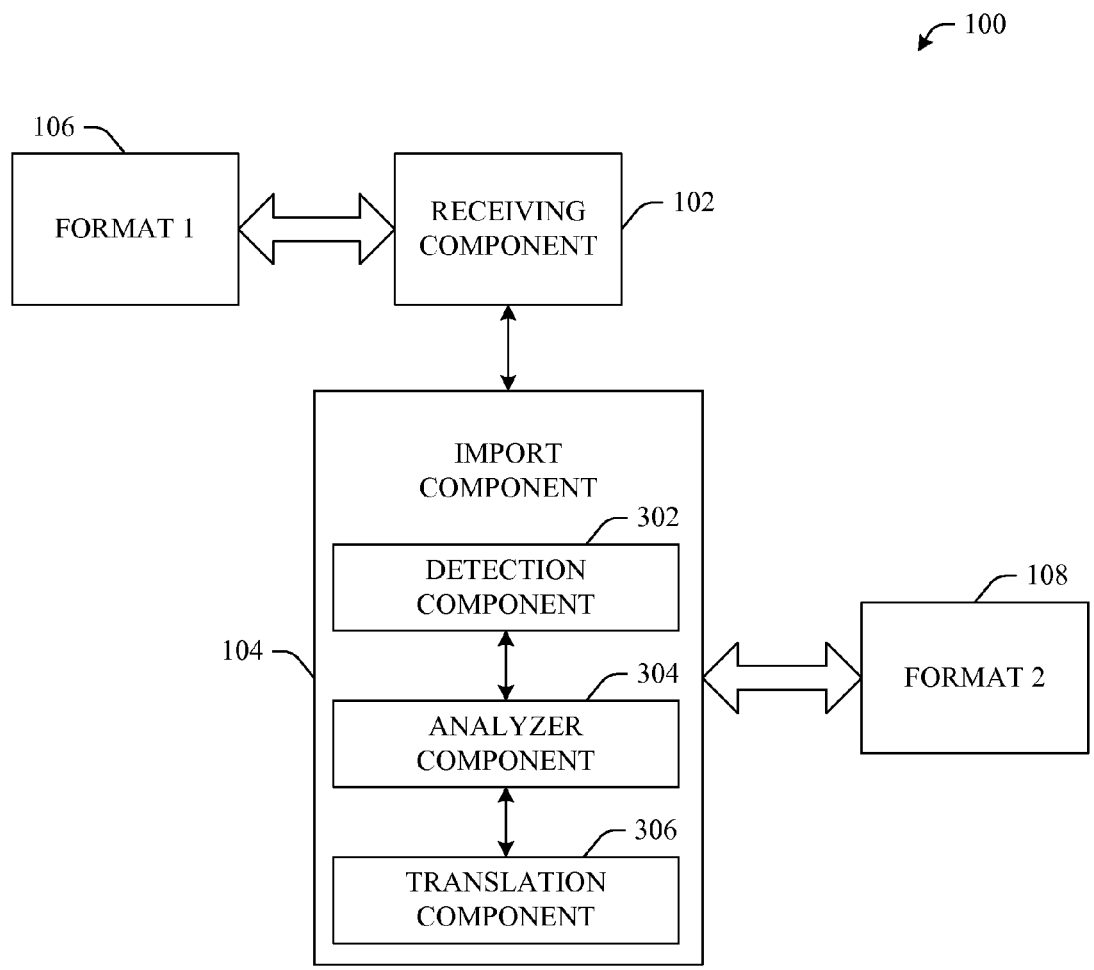
FIG. 3 illustrates a detailed block diagram of an exemplary import component in accordance with an aspect of the innovation.

Turning now to FIG. 3, an alternative architectural diagram of system 100 is shown. As illustrated, import component 104 can include a detection component 302, an analyzer component 304 and a translation component 306. Each of these components (302, 304, 306) contributes to the novel conversion and import functionality of the innovation. Although three distinct components are shown inclusive to the import component 104 in FIG. 3, it is to be understood that all or a subset of the functionality shown can be incorporated into any number of components without departing from the spirit and/or scope of the innovation and claims appended hereto.

As described supra, the subject innovation is not aware of any of the characteristics of the original format (e.g., 106) of the document. More particularly, the innovation is not aware of how the data is structured in accordance with a particular specification. Rather, the subject innovation employs a display file (or visual rendering) to generate a conversion to the target format (e.g., 108). This display file is accepted by the receiving component 102 and transferred to the import component 104. Alternatively, the display file can be received in parsed segments of a visual rendering, or parsed by the receiving component 102, thereby effectuating the conversion. In this example, continuous strings of text (e.g., raster representations) can be scanned to identify embedded format codes within the visual representation.

In one aspect, the subject innovation can receive the instruction from a print driver or any other capable application. In other words, the subject innovation can interpret the raster representation instructions to determine a document's text, layout, format, etc. Based upon this interpretation, the document can be converted into a target format, for example, word processing format.

Therefore, the subject system can be universal and can be employed to convert any document to any target format (e.g., word processor document, spreadsheet). All in all, in one aspect, the system can be employed to convert from any first format to any second format by rasterizing a visual representation of the data of an original format. By obtaining a raster representation of the data, the system can employ a detection component 302 to extract data that can be converted to any other format.

The invention can obtain the rasterized data in any manner—for example, the print driver is a convenient mechanism for which to intercept the raster representation. The innovation can also employ the final print output which can be a bitmap. As well, in accordance with the novel conversion, the innovation can make use of intermediate printing data to effect conversion from one format to a target format 108. In either case, the analyzer component 304 can interpret the raster representation of the data to commence conversion to a target format 108.

For example, in the case of intercepting intermediate printing data, the system can employ a print driver to intercept the raster representation of data by intercepting text display calls, graphics display calls, bitmap display calls, etc. By intercepting each of these calls, information can be collected via the detection component 302 with respect to the display. For example, if a portion of the page only contains text output printing calls, it is known that this portion of the page contains merely text, therefore, the analyzer component 304 can be utilized to perform text analysis (e.g., OCR) in order to interpret the information.

Similarly, if the detection component 302 determines that a complete page is taken up by a color or bitmap output call, the innovation, via analyzer component 304, can interpret the page as a bitmap rather than trying to analyze it to look for text and other characters. It will be appreciated upon a review of the figures that follows that a heuristic and/or machine learning component can be employed to facilitate evaluation of the document content and/or structure. In operation and with respect to one aspect, the innovation can intercept the data just prior to the full rasterization thereafter extracting, interpreting, converting and importing the data to the target format 108.

For example, when printing two characters, it is possible for the characters to overlap or to be linked in some unique manner. Accordingly, segmenting the characters via the analyzer component 304 from the pixels could be particularly difficult. However, if intercepted just prior to printing the characters, the translation component 306 via an output from the analyzer component 304, can generate an instruction to insert a bitmap of the image at a particular location. Therefore, because it can be possible to determine when a bitmap ends and another begins, this determination can assist in the recognition of the document.

Figure 4:
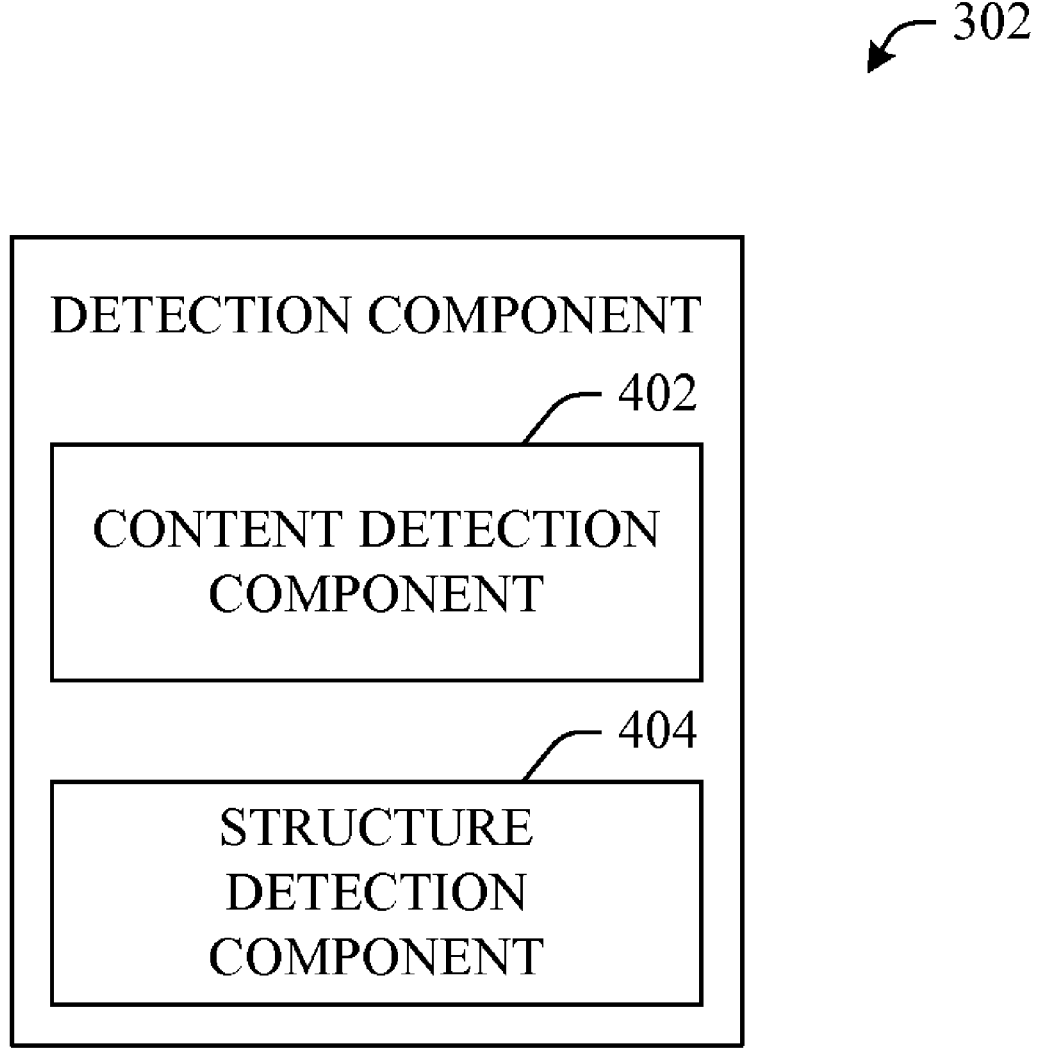
FIG. 4 illustrates a detailed block diagram of an exemplary detection component in accordance with an aspect of the innovation.

Following is a discussion of the three sub-components of the import component 104—the detection component 302, the analyzer component 304 and the translation component 306. Referring first to FIG. 4, a block diagram of an exemplary detection component 302 is shown. As described supra, the innovation can detect content and structure of a document in a first format in preparation for analysis, conversion and import into a second format. More particularly, the detection component can include a content detection component 402 and a structure detection component 404.

In operation, the content detection component 402 can determine content (e.g., text, images, . . . ) included within the body of a document. This detection can be facilitated by examining a visual rendering (or print representation) of a document. The structure detection component 404 can be employed to determine structure (e.g., layout) associated with a selected document. For example, the structure detection component 404 can be employed to determine margins, tabs, paragraphs, placement, etc. with respect to the layout of the document. Once detected, the particulars related to the content and structure can be input into the analyzer component 304 as shown in FIG. 5.

Figure 5:
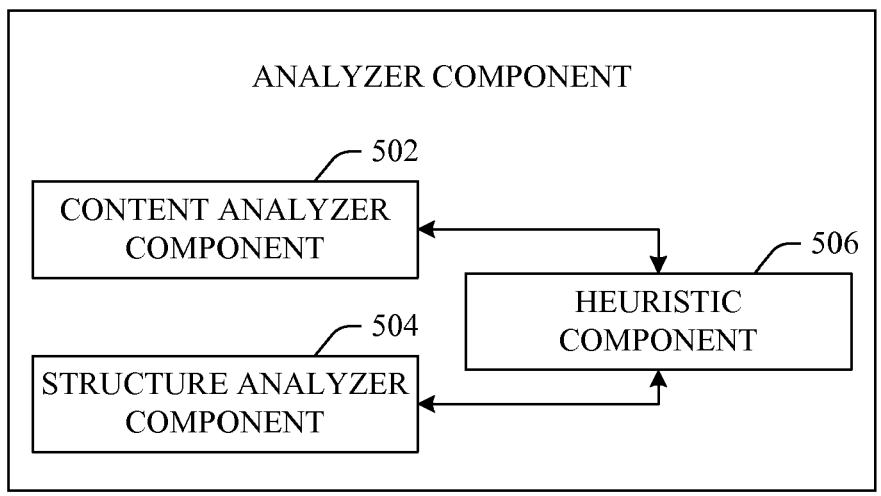
FIG. 5 illustrates a detailed block diagram of an exemplary analyzer component in accordance with an aspect of the innovation.

Turning now to FIG. 5, a block diagram of an exemplary analyzer component 304 is shown. The novel analyzer component 304 can evaluate and process all data and structure included within the original document format (e.g., bitmap). As an optimization, in one aspect, the innovation can optionally employ an intermediate raster representation to assist with the analysis of the final output display. It is to be appreciated that the processing and analysis of the final output is a key and novel feature in the system/process of the innovation.

As illustrated, the analyzer component 304 can include a content analyzer component 502, a structure (e.g., layout) analyzer component 504 and a heuristic component 506. These novel components can be employed to analyze the rendered and/or visual format of the document. As described supra, in accordance with the novel innovation, oftentimes a user will print or view a document. Because the visual appearance is used in the novel conversion described herein, it will be appreciated that it is not necessary to understand the specifics of the original or source format. In other words, because the final appearance is employed, the subject innovation can circumvent any potential problems due to third party format changes.

Figure 9:
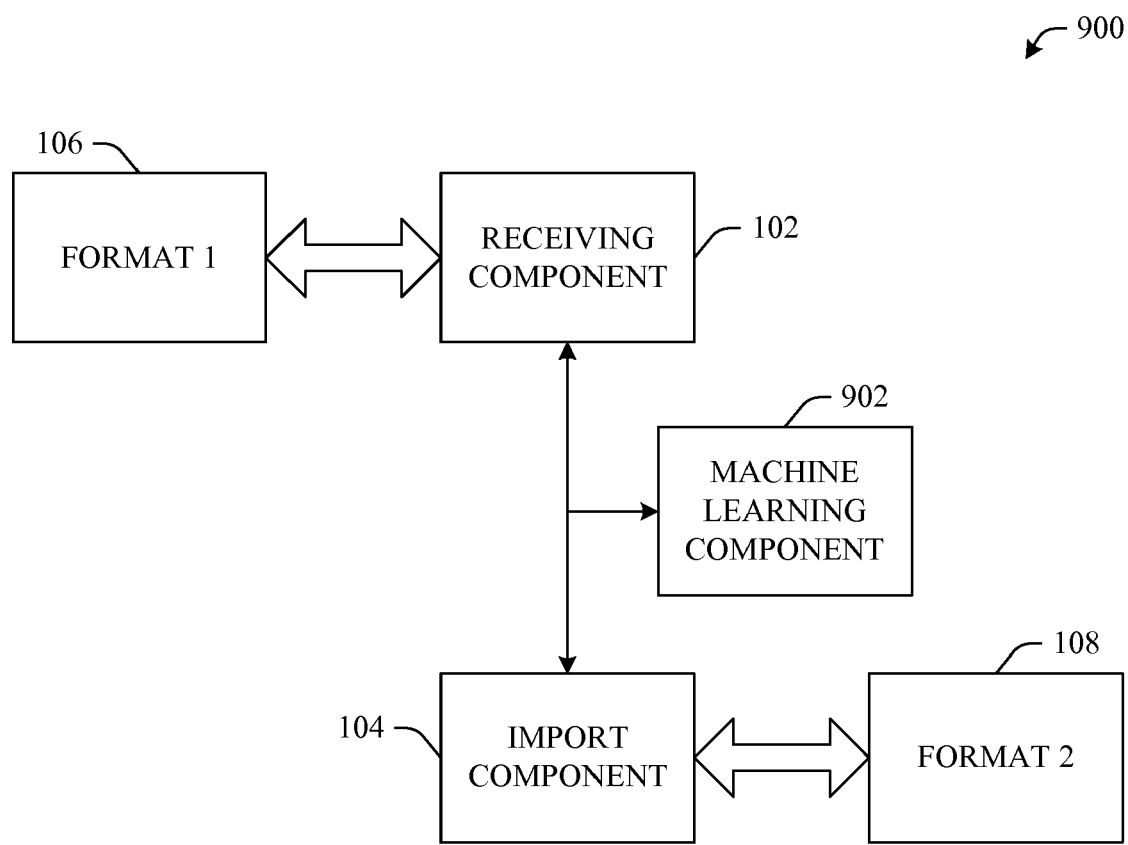
FIG. 9 illustrates an architecture including a machine learning component that can automate functionality in accordance with an aspect of the novel innovation.

In accordance with an aspect of the innovation, the heuristic component 506 can include a logic component and/or a reasoning component. The logic component (e.g., rules-based logic) can provide set logic or algorithms for determining target format capabilities with respect to a document. More advanced techniques can be provided by a reasoning component. As illustrated in FIG. 9 that follows, the reasoning component can reason or infer for instance utilizing machine learning, knowledge based systems, machine learning and the like. Accordingly, the heuristic component 506 via the reasoning component can analyze content and/or structure (e.g., layout) associated with a source and a target and automatically determine conversional capabilities. In essence, the heuristic component 506 can detect/analyze the type of data being provided in an original format and the type of data required with respect to the target format. Accordingly, the heuristic component 506 can determine an algorithm to appropriately import and/or transform the data into the target format.

Figure 6:
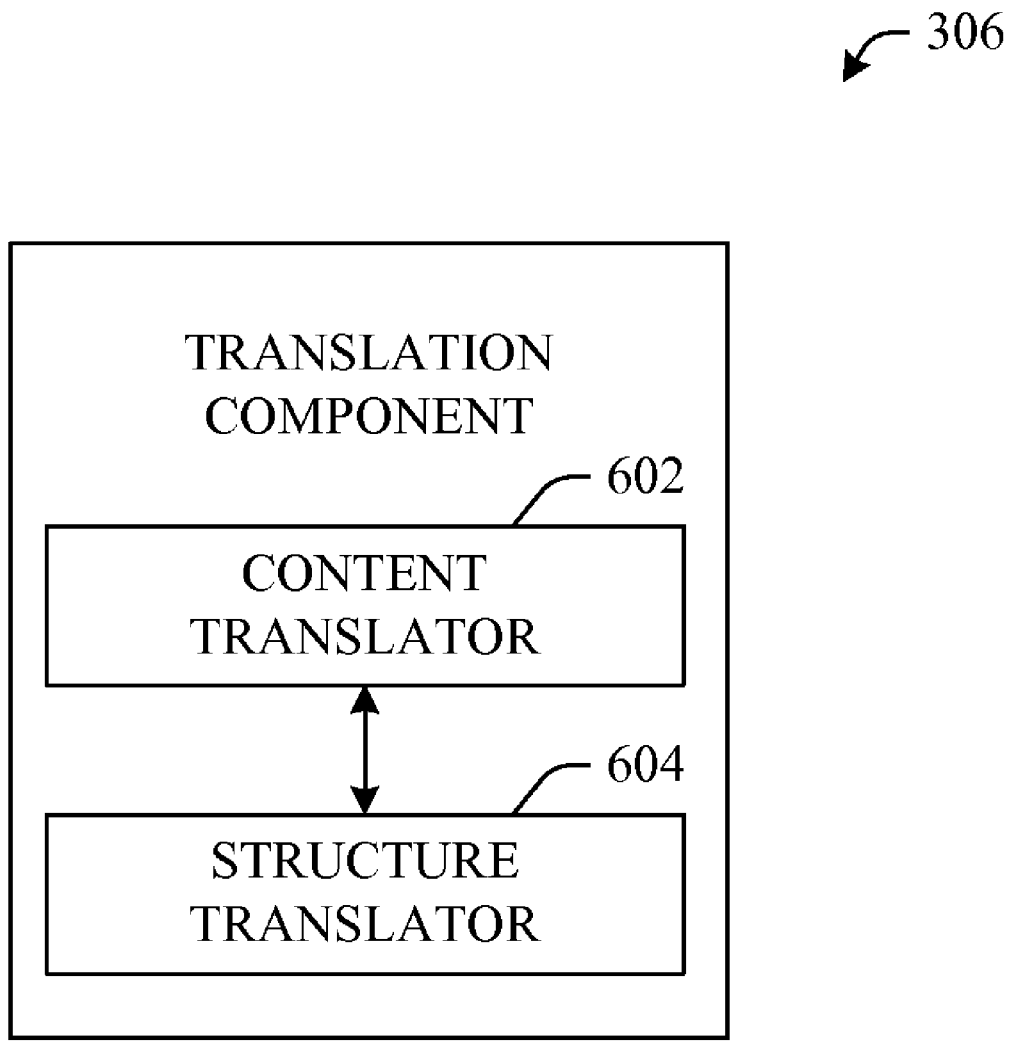
FIG. 6 illustrates a detailed block diagram of an exemplary translation component in accordance with an aspect of the innovation.

FIG. 6 illustrates a block diagram of an exemplary translation component 306. As shown, the translation component 306 can include a content translator 602 and a structure translator 604. In operation, the content translator 602 can translate document content into the target format. Similarly, the structure translator 604 can convert the structure (e.g., layout) into the target format. These novel components will be better understood upon a review of the figure that follows. However, it is to be appreciated that a particularly novel feature of the innovation is translation of both content and structure from one format into a target format.

Figure 7:
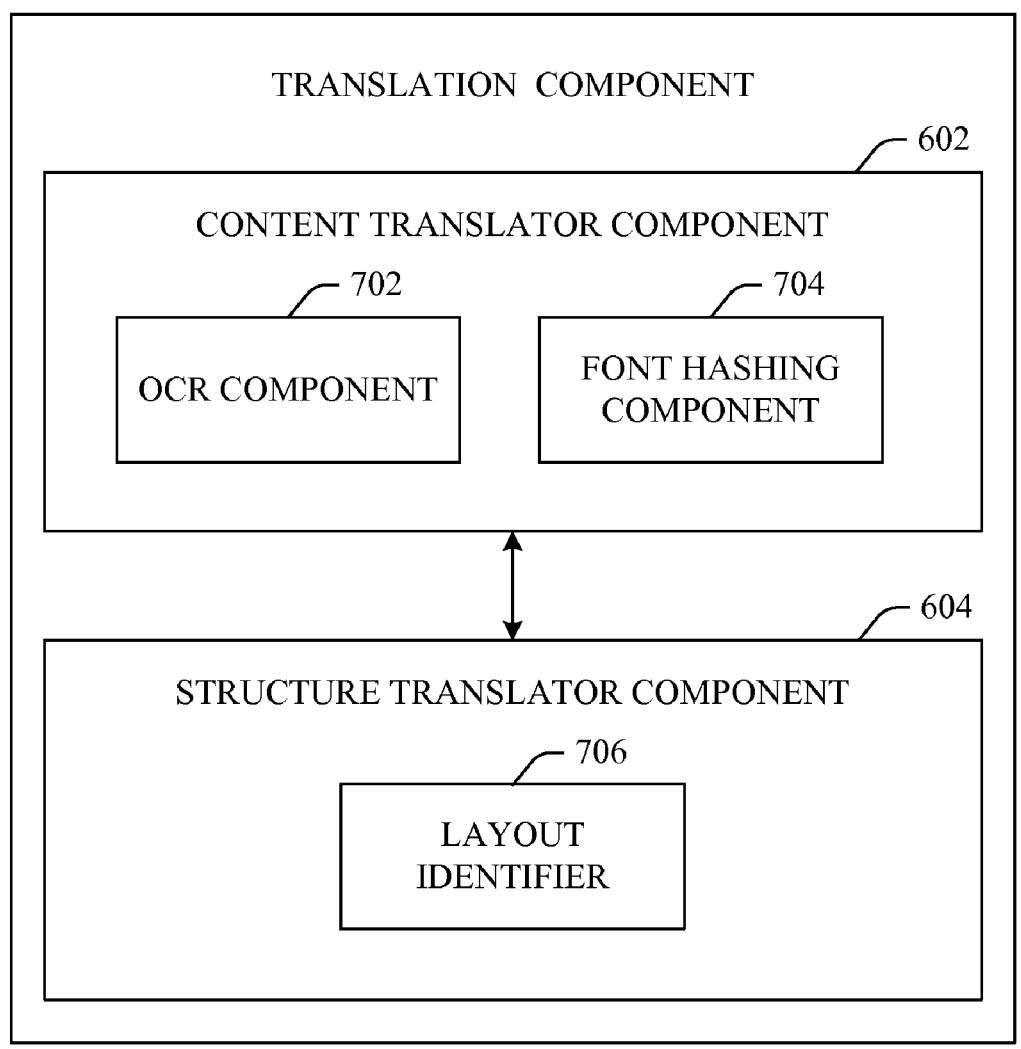
FIG. 7 illustrates a detailed block diagram of exemplary content and structure translator components in accordance with an aspect of the innovation.

FIG. 7 illustrates a more detailed block diagram of the content translator component 602 and the structure translator component 604. As shown, in one aspect, the content translator component 602 can include an optical character recognition (OCR) component 702 and a font hashing component 704. In aspects, the OCR component 702 can be employed to translate typewritten, hand printed and/or cursive textual content. It will be understood and appreciated that the OCR component 702 can include computer-implemented software designed to translate text into machine-editable text of a target format. Similarly, OCR can be employed to translate pictures of characters into a standard encoding scheme representing the characters in ASCII or Unicode format.

The font hashing component 704 is representative of an alternative mechanism of OCR. In accordance with the font hashing component 704, the hashing approach can be used to not only recognize the character codes but also, size, style (e.g., bold, italic), and font name related to the characters. It is to be understood that the hashing approach can scale to hundreds of fonts and thousands of characters per font. Further, it will be appreciated that font hashing is extremely fast and can recognize over 100,000 characters per second. As such, the font hashing component 704 can be employed to enhance turnaround time of a document conversion.

In accordance with the font hashing component 704, character glyphs can be hashed using either their contours or rasterized bitmaps. Glyph hashes can be collected in a hash table and used for OCR. The size of the table can be chosen for an optimal trade-off between available memory and desired classification accuracy. As such, heuristics (e.g., logic and/or reasoning) can be employed to optimize the tradeoff.

Referring again to FIG. 7, the structure translator 604 can include a layout identifier 706 capable of determining specifics related to the document layout. For instance, the layout identifier 706 can determine document layout characteristics including but, not limited to, spacing, margins, paragraphs, table identifiers, borders, or the like. Once identified, the structure translator component 604 can convert these characteristics into the target format. Accordingly, the characteristics can be imported into the target format together with the content from the content translator component 602. Thus, a functional document can be generated in the target format.

Figure 8:
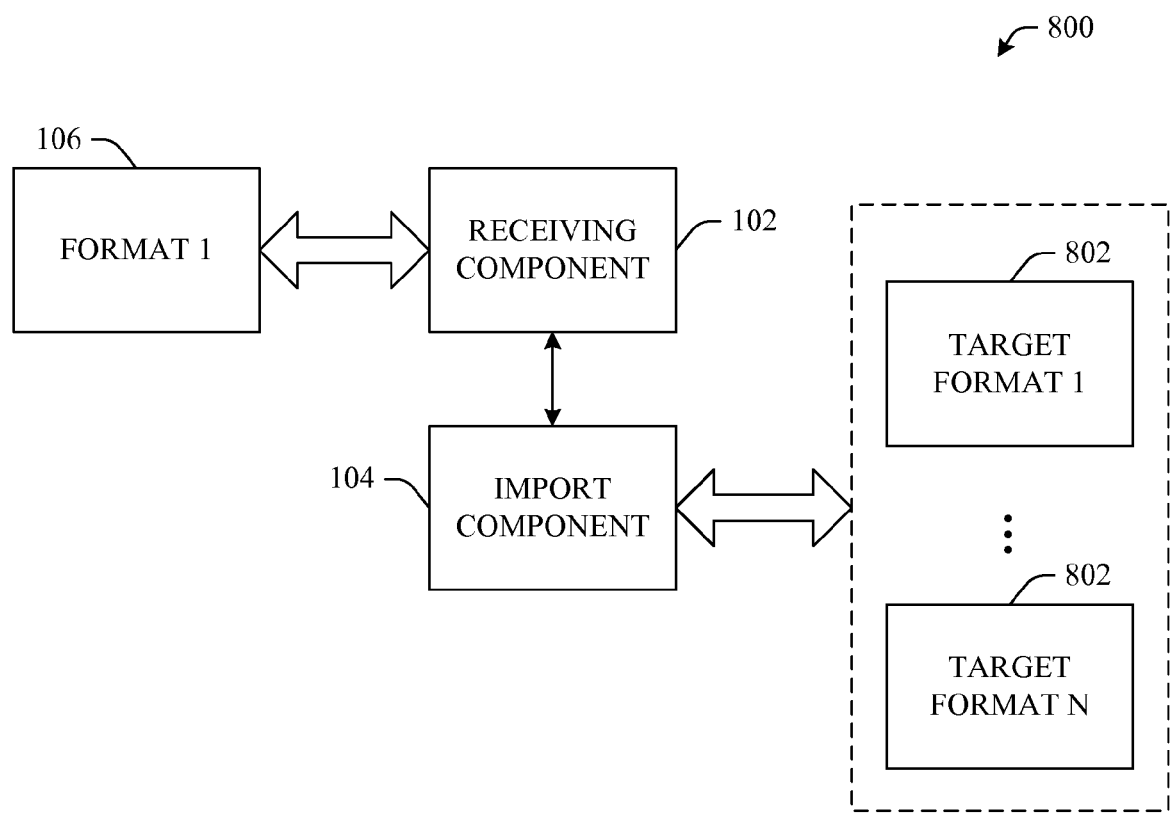
FIG. 8 illustrates a system that converts a document from a source format into multiple target formats in accordance with an aspect of the innovation

Turning now to FIG. 8, an alternative architectural diagram of a system 800 is shown. More particularly, the system 800 can be employed to convert a document from an original format 106 into a plurality of target formats. As shown, the system 800 can be employed to convert portions of a document into 1 to N target formats, where N is an integer. It is to be understood and appreciated that 1 to N target formats can be referred to individually or collectively as target formats 802.

In operation, the system 800 can convert a document from a first original format 106 into a plurality of target formats 802. By way of example and not limitation, the innovation can be employed to convert a document having multiple formats. For instance, a word processing document having text format and image format portions can be converted into a target word processing document having an embedded image therein. More particularly, the embedded image can be formatted in a disparate format unrelated to the host format. By way of more particular example, a compound document technology (e.g., object linking and embedding (OLE) application) can be used to allow an object such as a spreadsheet, image or video clip to be embedded into a document. As such, when the embedded object is double clicked, the application associated to the object can be launched in order to edit it.

In operation, the import component 104, via sub-components (e.g., detection, analyzer, and translation components 302, 304, 306 of FIG. 3) can determine the appropriate formats associated to a particular content and/or structure. It is to be appreciated that heuristics (e.g., logic and/or reasoning) can be employed to determine the appropriate application format for each particular portion of the original document. Moreover, in operation, an object can be linked rather than embedded, in which case the converted document does not physically hold the object, but provides a pointer to it.

Whether a single or multiple target format is employed with respect to the conversion, it is to be understood and appreciated that in accordance with the conversion, portions of the document can be included in the target format as a bitmap within the target format file. In any case, it will be appreciated that the novel innovation can automatically infer the content and structure of a document thereby restoring the functionality of the original file through the conversion/import process.

By way of further example, in accordance with the novel functionality of the innovation, an original format document having two columns can be converted to a target word processing format thereby converting and enabling the column format together with the textual format. In other words, the text flow (e.g., columns) can be recognized and converted into the target word processing format. Essentially, the innovation can extract the document structure together with the content in order to effectuate the conversion.

Continuing with the example, a word processing document would have some text organized in some textual flow. For instance, the text flow might have columns, paragraphs, etc. each of which can be converted appropriately. As well, margins, column spacing, etc. can be interpreted and converted accordingly thereby generating a functional word processing document from document of a different original format. As described in greater detail supra, in one aspect, all of this information can be extracted based upon an image analysis of the raster representation of the original document.

It is to be appreciated that any characteristic that is included in a visual representation can be recovered and converted into a target format(s). For example, in the word processing example described supra, it is not conventionally possible to recover authoring information as it is not shown in the visual representation of the document. However, the innovation can employ heuristics to infer this authoring information. As well, the content (e.g., text, pictures) together with the structure (e.g., format, spacing) can be recovered, interpreted and converted into a target format(s).

It is to be understood that a particular novel feature of the innovation described herein is the import feature based upon rendering a third party document in its visual form. As described supra, the innovation can be based upon analyzing the visual (or rendered) form of a document and performing a conversion into a target format or group of target formats accordingly. More particularly, in the aforementioned example of converting into a word processing document format, the import feature for converting a PDF document, or any other original format, can refer to analyzing (e.g., parsing) the visual or rendered form, inferring all of the structure that the target word processing format understands (e.g., text, formulas, tables). Thereafter, it is a novel feature of the innovation to import the information (e.g., content, structure) and convert it accordingly.

All in all, the subject innovation can infer the logical structure (e.g., layout) of a document based upon a visual or rendered appearance. As described above, heuristics (e.g., logic and/or reasoning) can be employed to make decisions with respect to importing the document into a target format and/or formats. In other aspects, the innovation can employ an inquiry component (not shown) that queries a user of with respect to a particular import preference. For example, the system can query the user to determine how to insert the information, e.g., "should the portion be text with tabs, a table or a bitmap?" In one example, the query can be employed when issues are ambiguous or when errors are encountered. In these cases, user interaction can be employed. However, it is a further novel feature of the innovation to make determination automatically via heuristics.

FIG. 9 illustrates a system 900 that employs machine learning which facilitates automating one or more features in accordance with the subject innovation. The subject innovation (e.g., in connection with conversion, import) can employ various machine learning-based schemes (machine learning component 902) for carrying out various aspects thereof. For example, a process for determining a particular target format or formats related to a portion(s) of a document can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which target format(s) to employ, which content and/or structure to convert, how to resolve errors, etc.

Figure 10:
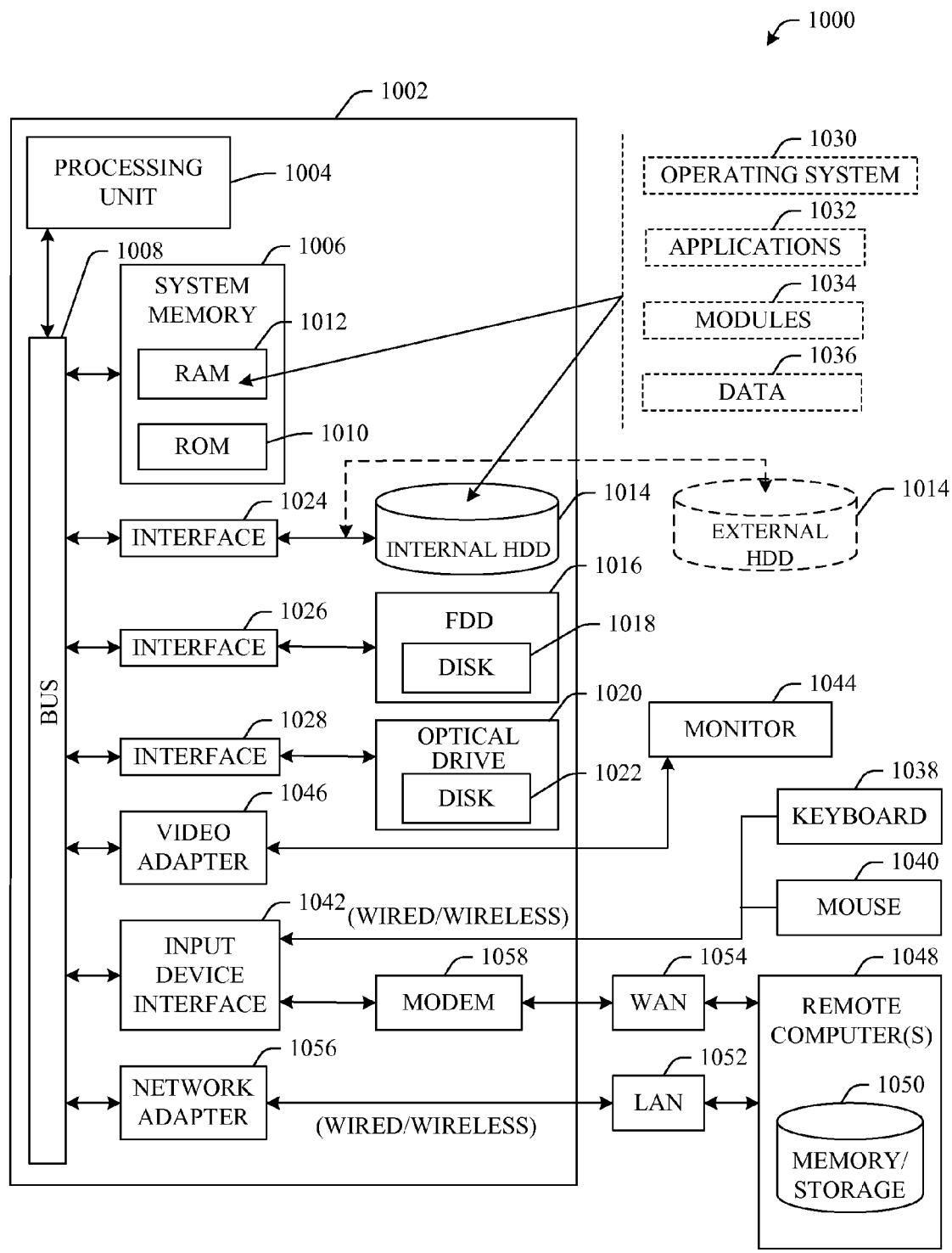
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
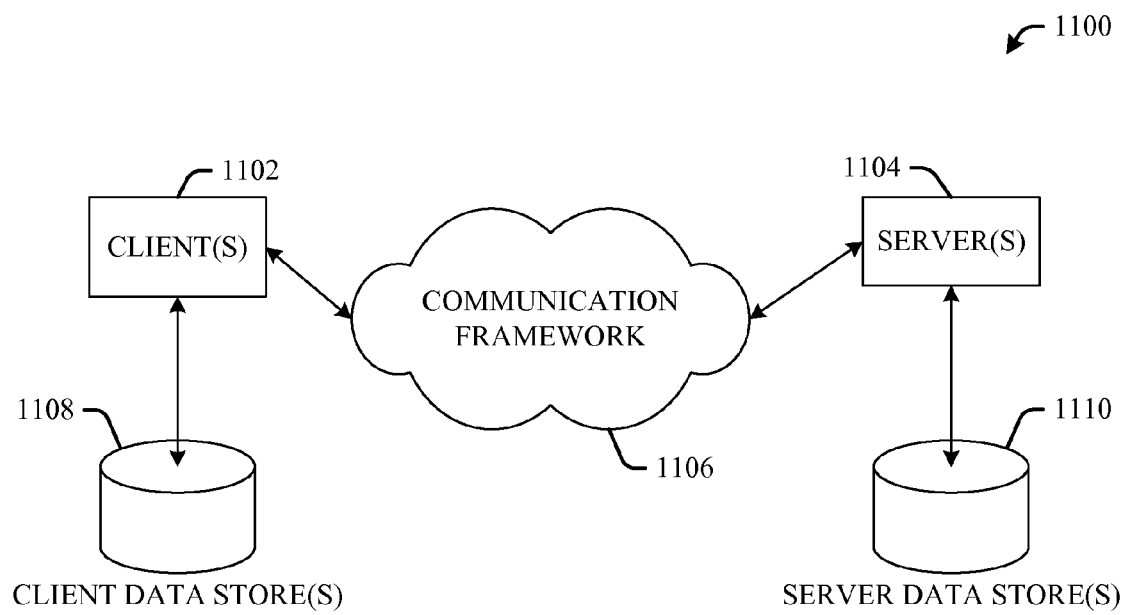
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage media storing computer-executable components executable via a processor, the computer-executable components comprising:

a print driver to render a visual representation of a document having a first format, the print driver intercepting at least one print call;

a receiving component to accept the rendered visual representation of the document in the first format;

an import component to generate a programmatically functional translation of content and structure associated with the document into the second format based on the at least one intercepted print call; and a display device to display the programmatically functional translation of content and structure.

2. The computer-readable storage media of claim 1, wherein the at least one intercepted print call includes a text output print call such that the import component generates the programmatically functional translation of content by performing object character recognition text analysis on the document.

3. The computer-readable storage media of claim 1, the import component includes:
a detection component to identify the content and the structure associated with the document; and
an analyzer component to generate an output based at least in part upon a heuristic analysis of the content and the structure of the document with respect to the second format, the heuristic analysis based at least in part upon a functional capability of the second format.

4. The computer-readable storage media of claim 1, wherein the print driver intercepts the at least one print call prior to a full rasterization of the document.

5. The computer-readable storage media of claim 4, wherein the import component includes a translation component that converts the content and the structure of the document in the first format into the second format based at least in part upon the output from the analyzer component.

6. The computer-readable storage media of claim 5, wherein the translation component includes a content translator component and a structure translator component.

7. The computer-readable storage media of claim 6, wherein the content translator component includes an optical character recognition component that converts a subset of the content of the document from the first format into the second format.

8. The computer-readable storage media of claim 7, wherein the content translator component includes a font hashing component that facilitates translation of the subset of the content of the first format to the second format.

9. The computer-readable storage media of claim 6, wherein the structure translator component includes a format identifier that recognizes a plurality of layout-related characteristics.

10. The computer-readable storage media of claim 9, wherein the structure translator component includes an import component that transfers a subset of the plurality of layout-related characteristics to the second format.

11. The computer-readable storage media of claim 10, wherein the plurality of layout-related characteristics is at least one of a margin, a bitmap location, a paragraph designator, a column designator, a table and a border.

12. The computer-readable storage media of claim 1, further comprising a machine learning component that employs a statistical-based analysis to infer an action that a user desires to be automatically performed.

13. A tangible computer-readable storage media comprising computer-program instructions executable by a processor, the computer-program instructions, when executed by the processor, to perform operations comprising:
determining content of the document via parsing a visual representation of the document in a first format, the content including textual content and pictorial characters;
inferring structure of the document via parsing the visual representation of the document in the first format, the structure including document layout characteristics; and
converting the document from the first format to a second format, wherein the converting the document from the first format to the second format comprises:
translating textual content of the document into machine-editable text;
translating pictorial characters of the document into a standard encoding scheme, wherein the translated machine-editable text and the translated standard encoding scheme are characteristics of the second format; and
translating document layout characteristics of the document to the second format.

14. The tangible computer-readable storage media of claim 13, wherein the textual content, pictorial characters, and document layout characteristics are translated together to convert the document from the first format to the second format.

15. The tangible computer-readable storage media of claim 14, wherein the converting the document from the first format to the second format further translates an embedded image of the document from a first embedded image format to a second embedded image format such that the second embedded image format is a further characteristic of the second format.

16. The tangible computer-readable storage media of claim 15, further comprising;
heuristically analyzing the content and structure of the first format with respect to the second format; and
translating the content and the structure from the first format to the second format based at least in part upon a result of the heuristic analysis.

17. A computer device comprising:
a processor; and
a memory coupled to the processor, the memory comprising computer-readable instructions executable by the processor, the computer-readable instructions, when executed by the processor, perform operations comprising:
determining a content and structure via a visual representation of the document in the first format, the content including textual content and the structure including document layout characteristics;
translating the textual content of the document into machine-editable text;
translating the document layout characteristics to a second format; and
importing the translated machine-editable text together with the translated document layout characteristics into the second format.

18. The computing device of claim 17, wherein the computer-readable instructions further perform operations comprising heuristically determining if the content and structure from the first format is recognizable in the second format.

19. The computing device of claim 18, wherein the computer-readable instructions further perform operations comprising generating the visual representation of the document.

20. The computing device of claim 19, wherein the computer-readable instructions further perform operations comprising converting a subset of the content and the structure of the document from the first format into a third format associated with the document.

* * * * *

UNITED STATES PATENT AND TRADEMARK OFFICE
CERTIFICATE OF CORRECTION

| | | |
|---|---|---|
| PATENT NO. | : 7,623,710 B2 | Page 1 of 1 |
| APPLICATION NO. | : 11/353915 | |
| DATED | : November 24, 2009 | |
| INVENTOR(S) | : Patrice Y. Simard et al. | |

It is certified that error appears in the above-identified patent and that said Letters Patent is hereby corrected as shown below:

In column 16, line 25, in Claim 16, delete "comprising;" and insert -- comprising: --, therefor.

Signed and Sealed this
Eighth Day of February, 2011

David J. Kappos
*Director of the United States Patent and Trademark Office*